(12) United States Patent
Murley et al.

(10) Patent No.: US 7,133,884 B1
(45) Date of Patent: Nov. 7, 2006

(54) UNOBTRUSIVE POINT-IN-TIME CONSISTENT COPIES

(75) Inventors: Michael S. Murley, Austin, TX (US); Thomas G. Price, Austin, TX (US); Kenneth M. McDonald, Cedar Park, TX (US); Stanley J. Dee, Austin, TX (US); Linda S. Ball, Austin, TX (US)

(73) Assignee: BMC Software, Inc., Houston, TX (US)

( * ) Notice: Subject to any disclaimer, the term of this patent is extended or adjusted under 35 U.S.C. 154(b) by 463 days.

(21) Appl. No.: 10/723,677

(22) Filed: Nov. 26, 2003

(51) Int. Cl.
*G06F 17/00* (2006.01)
(52) U.S. Cl. ....................... 707/202; 711/162
(58) Field of Classification Search ............... None
See application file for complete search history.

(56) References Cited

U.S. PATENT DOCUMENTS

| | | | |
|---|---|---|---|
| 6,202,136 B1* | 3/2001 | Wikle et al. | 711/162 |
| 6,604,118 B1* | 8/2003 | Kleiman et al. | 707/203 |
| 6,618,794 B1* | 9/2003 | Sicola et al. | 711/154 |
| 7,024,528 B1* | 4/2006 | LeCrone et al. | 711/162 |
| 2003/0093444 A1* | 5/2003 | Huxoll | 707/204 |
| 2004/0139367 A1* | 7/2004 | Boyd et al. | 714/7 |
| 2004/0260896 A1* | 12/2004 | Werner et al. | 711/162 |
| 2005/0289533 A1* | 12/2005 | Wang et al. | 717/168 |

* cited by examiner

*Primary Examiner*—Uyen Le
(74) *Attorney, Agent, or Firm*—Wong, Cabello, Lutsch, Rutherford & Brucculeri, L.L.P.

(57) ABSTRACT

Techniques to create physically and transactionally consistent copies of one or more database objects without impacting the availability of the target database objects are described. In one technique, a consistent copy is created as of the time a copy utility is executed. In another technique, a consistent copy is created as of an arbitrary specified time. This approach modifies a prior copy to bring it "up-to-date." In yet another technique, a consistent copy is created by starting with a current snapshot of the target database objects and selectively removing updates from it back to a user specified arbitrary point-in-time. Each of the described techniques generate consistent copies of the target database objects without blocking users from accessing the target objects during the copy operation.

38 Claims, 4 Drawing Sheets

UNOBTRUSIVE POINT-IN-TIME CONSISTENT COPIES

BACKGROUND

The invention relates generally to database systems and, more particularly, to the generation of point-in-time consistent copies of one or more database objects without impacting the database's availability. Techniques in accordance with the invention may also be used during recovery operations to generate point-in-time consistent images of one or more recovered database objects, again without impacting the database's availability during creation of the recovered database object.

A database is, fundamentally, a computerized record-keeping system in which large amounts of information may be stored in a structured manner for ease of subsequent retrieval and processing. Large databases such as the DB2® database from the International Business Machines Corporation of Armonk, N.Y., are typically managed through a database management system ("DBMS"). A DBMS, in turn, provides four primary functions: management of physical storage; a user interface (e.g., the Structured Query Language, "SQL"); data security (e.g., user passwords and view restriction policies); and (4) data consistency or integrity.

There are two types of consistency—physical and transactional. Physical consistency refers to the integrity between physical pages of storage. For example, index pointers must be consistent with the data pages to which they point, a pointer record and the overflow record it points to on another page must be consistent, an index non-leaf page and the leaf page it points to must be consistent, and any DBMS defined referential integrity constraints established between database objects must be maintained in the face of data updates. Transactional consistency refers to the condition wherein a database's data is consistent across (although not necessarily during) a transaction. A transaction is generally defined as all database operations (e.g., updates) associated with a single logical action. To permit the DBMS to track transactions comprising multiple operations, and to maintain the database's integrity in light of such operations (i.e., transactional consistency), all database operations related to a transaction are grouped into a single unit of work ("UOW"). Until all updates in a UOW are committed (that is, applied to and made part of the database object to which they are directed and such action noted in the DBMS's log files), the UOW is said to be "inflight."

It is important that when generating a copy of a database (or a portion thereof) the resulting copy is both physically and transactionally consistent. To ensure this consistency, prior art database copy techniques (1) block write-access to the database objects being copied, including all referentially related objects, (2) wait for all inflight UOW to complete, and (3) copy the database objects. While this process generates a consistent copy of the database objects as of the time the copy operation was initiated, it prevents users from updating the those database objects at least until the inflight UOW are complete. This can be a significant drawback for large or complex databases and/or those databases that experience large update volumes.

Another prior art technique for generating a consistent database copy relies on the DBMS periodically quiescing the database. By this it is meant that the DBMS periodically (at user specified intervals) blocks user access to the database, allows pending inflight UOW to complete and then records in its logs or system catalog table the time at which this operation is complete and the database is consistent. A subsequent recovery operation can restore the database to a prior consistent state either by applying database undo commands backward from the current time to the desired point in time, or by restoring a prior copy and applying database redo commands forward up until the desired point in time. While this technique can recover a damaged database, it relies on the use of quiesce points in a DBMS's logs which are intrusive to create. In addition, the ability of a user to recover a consistent copy of their database is limited to the temporal granularity of their quiesce actions—the more often a quiesce is performed, the finer the time resolution for recovery operations, but the more often users are blocked from updating the data because of quiesce operations.

Yet another prior art technique for creating a consistent database copy involves (1) specifying a point in time at which the consistent copy is to be created, (2) performing a DBMS-wide restart to create log records to remove the effect of UOW that were in inflight at the specified point in time, (3) restoring a copy of the database made prior to the specified point in time, and (4) performing another operation to apply the log records created during step 2 to the restored copy generated during step 3. In a DB2® environment, this is referred to as a conditional restart. While the result is a copy of the targeted database that is both physically and transactionally consistent, all databases managed by the DBMS restarted are taken off-line during the restart operation. As one DBMS may manage multiple databases, each of which may be operationally significant, this approach can cause massive outages for users.

Thus, it would be beneficial to provide methods and devices to generate copies of a database (or portions thereof) that are physically and transactionally consistent and which do not cause user access outages during the operation. It would further be beneficial to provide methods and devices to generate an image of a database (or portions thereof) that is physically and transactionally consistent at an arbitrary specified point in time and which do not cause user access outages during the operation.

SUMMARY

In general, methods in accordance with the invention provide a means to unobtrusively copy or recover database objects. In one embodiment, the invention creates a snapshot of one or more source database objects at a point-in-time in a manner that does not substantially block access to the source database objects, and then makes the snapshot consistent as of the point-in-time.

In another embodiment, the invention identifies one or more source database objects in a database, determines a point-in-time, obtains a copy of the identified one or more source database objects (the prior copy having a creation time before the specified point-in-time) and makes the prior copy consistent as of the point-in-time.

In yet another embodiment, the invention identifies one or more source database objects in a database, determines a point-in-time, creates a snapshot of the one or more source database objects at a time after the point-in-time and in a manner that does not substantially block access to the source database objects in the database, and makes the snapshot consistent as of the point-in-time.

Methods in accordance with the invention may be stored in any media that is readable and executable by a computer system.

DETAILED DESCRIPTION

Techniques (including methods and devices) to provide point-in-time consistent copies of one or more database objects without impacting the database's availability are described. The following embodiments of the invention, described in terms of DB2' database copy and restore operations, are illustrative only and are not to be considered limiting in any respect.

Figure 1:
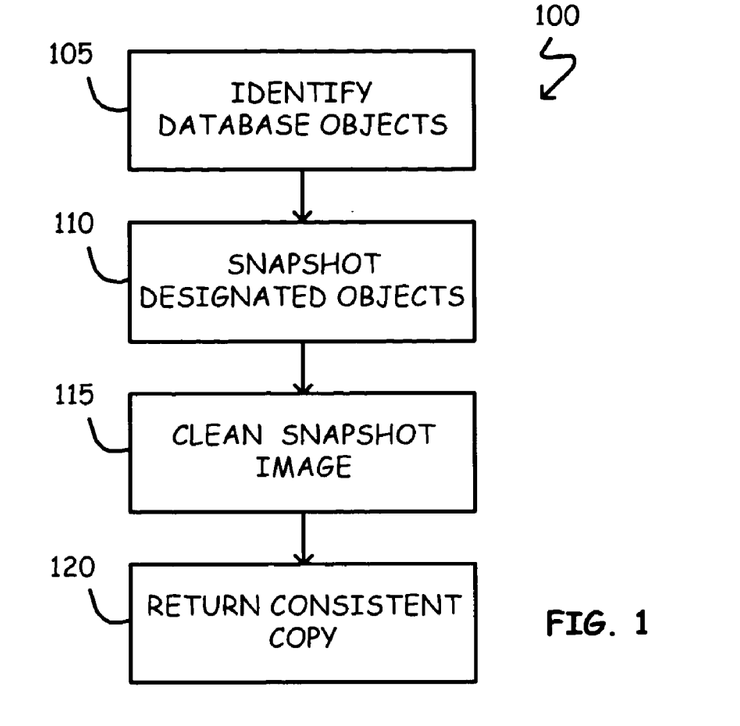
FIG. 1 shows, in flowchart form, a copy operation in accordance with one embodiment of the invention.

Referring to FIG. 1, in one embodiment of the invention copy utility 100 creates a point-in-time consistent copy of one or more designated database objects without impacting the designated objects' availability to other users. Initially, the objects to be copied are identified, including those objects related through referential or other constraints (block 105). A snapshot of the identified objects is then made (block 110) and the resulting image is processed to make it physically and transactionally consistent (block 115). Once consistent, the generated copy may be used in any manner desired by the user (block 120). For example, if the source database is a production database, the consistent copy in accordance with the acts of block 115 may be used for decision support operations, ad hoc queries, report generation, testing, or for data warehousing—all without impacting the original data source or its users.

With respect to the acts of blocks 105 and 110, both tablespaces and indexes may be copied in accordance with the invention. With respect to the acts of block 110, snapshots preferably utilize intelligent storage devices as they permit complete copies of a data set in a few seconds, regardless of the size of the objects being copied. One illustrative application that makes use of such intelligent storage devices and which is suitable for use with the present invention is the SNAPSHOT UPGRADE FEATURE for DB2® by BMC Software, Inc. of Houston, Tex. Whatever technique is used to create an image of the targeted database object(s), the image must be of a type against which DBMS log records may be applied. It will be recognized by one of ordinary skill in the art that such an image may be created in one step (e.g., through the use of intelligent storage devices), or it may be generated in a series of steps, only the last one of which creates a copy against which database log file entries may be applied. In a DB2® embodiment, the image created in accordance with the acts of block 110 is a SHRLEVEL CHANGE snapshot. It is significant to note, the acts of block 110 generate a point-in-time image of the targeted database objects as they exist on the storage device or system. Thus, the image may contain uncommitted changes to the target objects. In addition, they may not contain committed changes if such changes still reside in buffer pool storage associated with the DBMS.

Figure 2:
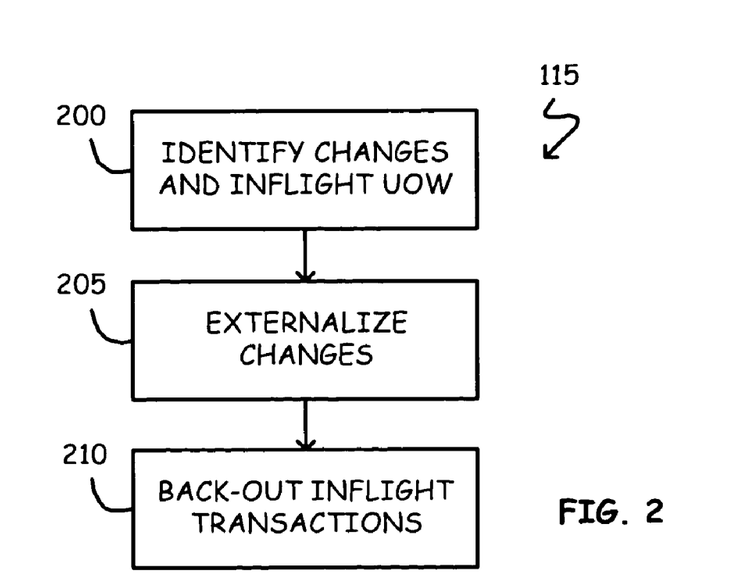
FIG. 2 shows, in flowchart form, a method to transform a point-in-time image of a database (or portions thereof) into a consistent image in accordance with one embodiment of the invention.

With respect to the acts of block 115, FIG. 2 shows one technique for cleaning a snapshot image in accordance with the invention. As used herein, the term "cleaning" means to make an image physically and transactionally consistent. Initially, DBMS logs are used to identify changes made to the target database objects that are not yet reflected in external storage (and, therefore, the image created in accordance with the acts of block 110) and any inflight UOW as of the time the snapshot generated in accordance with the acts of 110 was completed (block 200). Identified changes (committed and un-committed) are then externalized to the image copy (block 205). In one embodiment, changes identified during the acts of block 200 may be sorted by the page of memory in which the change is to be made (where a page corresponds to a portion of an object). In this way, only those pages of memory that need to be updated are accessed and then, only once. It is further noted that, because log entries are applied directly against the image copy, there is no interference with the source data set (i.e., the database from which the target objects have been copied). Next, those updates to the image that are associated with inflight transactions/UOW are removed from the image copy (block 210).

Figure 3:
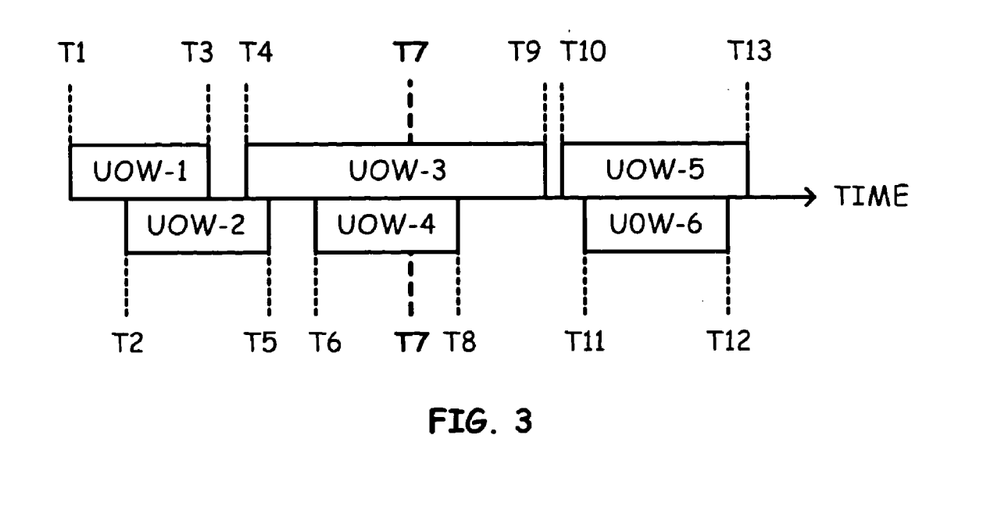
FIG. 3 shows an example of overlapping and inflight units of work.

The difficulty with, and the need to resolve inflight UOW may be seen diagrammatically in FIG. 3. As shown, each UOW begins and ends at a different time (recall, a UOW is a group of database updates related to a single logical transaction). If, for example, copy utility 100 is invoked and at time T7 a snapshot in accordance with block 110 has been created, both UOW-3 and UOW-4 are "inflight"—some, but not all, updates associated with each of UOW 3 and 4 have been made. To make the copy transactionally consistent as of T7, it is necessary to remove or back-out those updates associated with both UOW-3 and UOW-4 made prior to time T7. To maintain physical consistency during the acts of block 210, however, those updates associated with structural changes to the target database objects are not backed-out even if the update that necessitated the structural change was backed-out. For example, space allocation updates are not removed even if the change that triggered the structural update was removed. An illustrative structural change is an index page split.

By way of example, in a DB2® embodiment copy utility 100 interrogates checkpoint records within the DBMS logs to identify inflight UOW and control blocks maintained by the DBMS in working memory to identify the earliest time at which changes to the targeted database objects have not been written to long-term storage. Starting at the identified time, each log entry is checked to see if it has been pushed into the database (and, therefore, the image copy). If the log entry has not been applied, the update is externalized to the image copy. If the log entry has been applied, the current log entry is skipped and the next log entry is evaluated.

Figure 4:
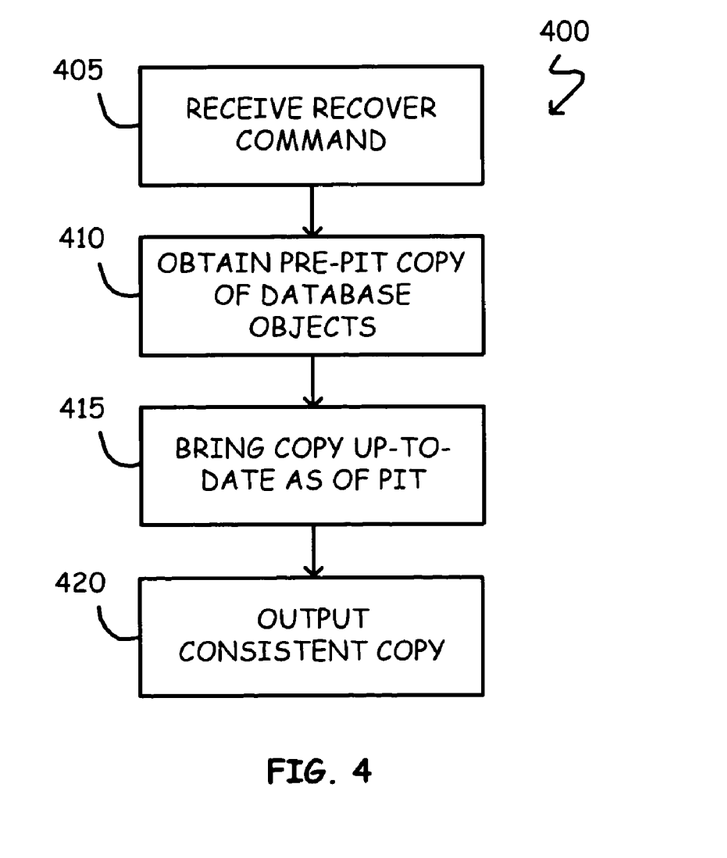
FIG. 4 shows, in flowchart form, a recover operation in accordance with one embodiment of the invention.

Referring to FIG. 4, in another embodiment of the invention recover utility 400 creates a consistent copy of one or more designated (target) database objects by modifying the prior created copy so that it is consistent at a designated and arbitrary point-in-time. Once invoked (block 405), a copy that predates the designated point-in-time (PIT) is obtained (block 410), made consistent at the designated point-in-time in accordance with the invention (block 415) and output as directed by the user (block 420).

With respect to the acts of block 405, an illustrative recover utility command in accordance with this embodiment of the invention is shown in Table 1. As indicated, one or more tablespaces and/or one or more indexes targeted for recovery are identified [1] along with a user-specified point-in-time at which the generated copy is to be consistent [2]. It will be recognized that the designated point-in-time may be specified, for example, in "timestamp" format (e.g., YYYY.MM.DD.HH.MM.SSSSSS) or by log record sequence number—the exact implementation technique is a matter of design choice. In addition, a prior consistent copy is designated [3]. Further, a user may specify whether the generated copy is to replace the original or source data objects (e.g., copy-flag equals false) or whether the generated copy is to be output without impacting or disturbing the original or source data objects (e.g., copy-flag equal true) [4]. That is, utility 400 in accordance with the invention can both generate a copy of a database (or portions thereof) that is consistent at a specified and arbitrary time, or it can recover and replace a database (or portions thereof) with a consistent point-in-time copy of itself.

TABLE 1

Recover Utility Command

RECOVER

| | |
|---|---|
| FROM tablespace-id . . . index-id . . . | [1] |
| AT point-in-time | [2] |
| USING prior-copy | [3] |
| OUTPUT-OPTION copy-flag | [4] |

With respect to the acts of block 410, an image copy of the source database is obtained. For example, if daily copies are made of a particular database, that copy made as close to, but before, the designated point-in-time is selected. In one embodiment, the location of the prior copy need not be made explicit (as in Table 1), but rather may be required to be at a prior defined location.

Figure 5:
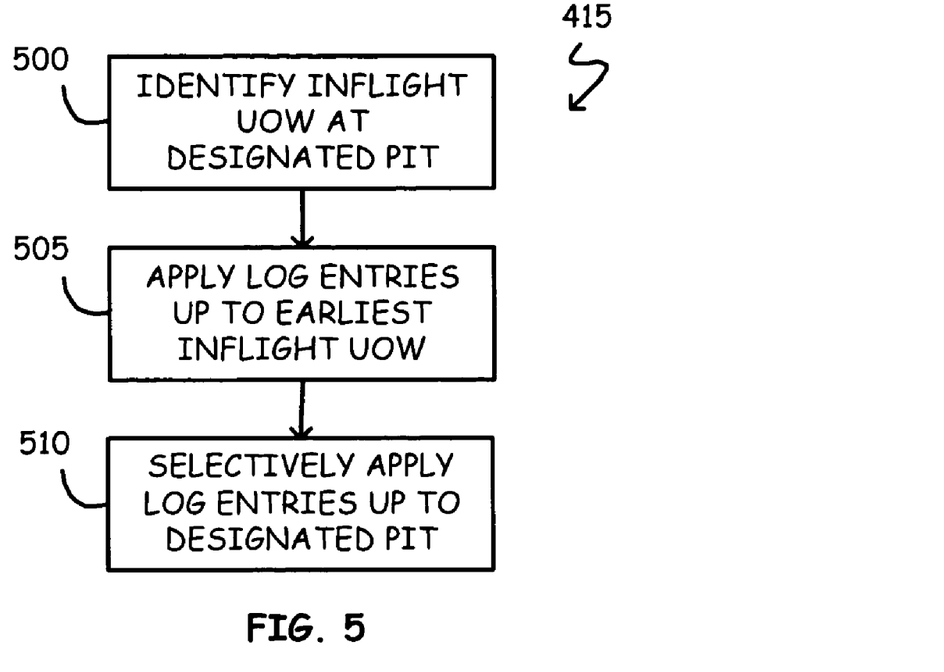
FIG. 5 shows, in flowchart form, a method to bring a copy of one or more database objects up to date as of a specified point-in-time in accordance with one embodiment of the invention.

With respect to the acts of block 415, FIG. 5 shows one technique for making a prior copy of a database (or portions thereof) consistent as of an arbitrary designated point-in-time (PIT). Initially, DBMS logs are used to identify those UOW that were inflight at the designated point-in-time (block 500). DBMS log records of the target database objects are then obtained and applied to the copy (obtained during the acts of block 410) from immediately after the time at which the copy was created up to that time at which the earliest identified inflight UOW was started as determined during the acts of block 500 (block 505). From this point in time forward until the designated point-in-time, only those log entries not associated with an inflight UOW are applied (block 510). In one embodiment, the log records applied during the acts of blocks 505 and 510 may first be sorted in accordance with the page of the database to which they apply before being applied. In this way, only those pages of memory that need to be updated are accessed and then, only once. It is noted that through the acts of block 415, log entries are applied directly against the obtained copy. Accordingly, there is no interference with the source data set (i.e., those operational database objects being recovered or copied).

With respect to the acts of block 420, and as specified by the output-option flag identified in Table 1, recover utility 400 in accordance with the invention may be used to recover a database (or portions thereof) that is consistent as of a designated and arbitrary time or to create a copy of a database (or portions thereof) that is consistent at a designated arbitrary time. If the recovery option is selected, recover utility 400 blocks all access to the recovered objects while it substitutes the recovered objects for the original objects. In one embodiment, this action is done on a page-by-page basis. That is, as each page of the target database objects are recovered (i.e., copied and made consistent in accordance with the acts of block 415). If the copy option is selected, recover utility 400 provides a consistent copy of the designated database objects in a manner as described above with respect to block 120 (see FIG. 1).

Figure 6:
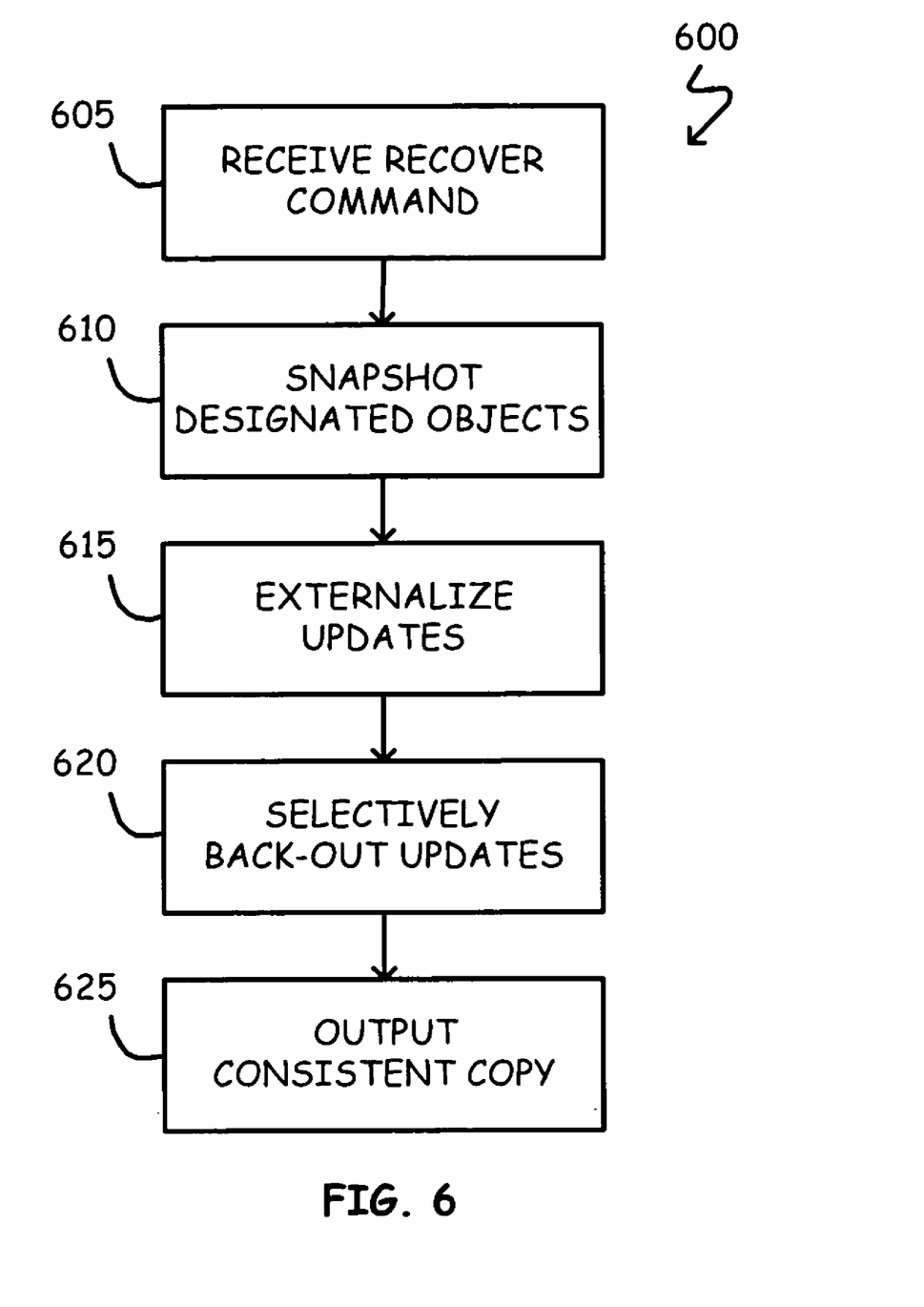
FIG. 6 shows, in flowchart form, a recover operation in accordance with another embodiment of the invention.

Referring to FIG. 6, in yet another embodiment of the invention recover utility 600 creates a consistent copy of one or more designated database objects at a designated and arbitrary point-in-time. Once invoked (block 605), a snapshot of the database (or portions thereof) targeted for recovery are made (block 610). Next, all updates subsequent to the specified point-in-time that have not been externalized (i.e., are in DBMS buffer pool storage) are externalized to the copy made in accordance with the acts of block 610 (block 615). DBMS logs are then used to back-out all updates made subsequent to the specified point-in-time and those updates associated with UOW that were inflight at the designated point-in-time (block 620). The resulting copy is now consistent as of the specified point-in-time and may be output as directed by the user (block 625).

With respect to the acts of block 605, the same utility invocation syntax outlined in Table 1 may be used—with the exception that no prior copy is identified. The snapshot created in accordance with the acts of block 610 is preferably generated using intelligent storage devices as described above in regard to the acts of block 110 of FIG. 1.

With respect to the acts of block 615, recover utility 600 may use DBMS logs to identify changes made to the target database objects prior to the specified point-in-time but that are not yet reflected in external storage (and, therefore, the image created in accordance with the acts of block 610) and any UOW that were inflight at the specified point-in-time. Identified changes (committed and un-committed) are then externalized to the image copy.

Figure 7:
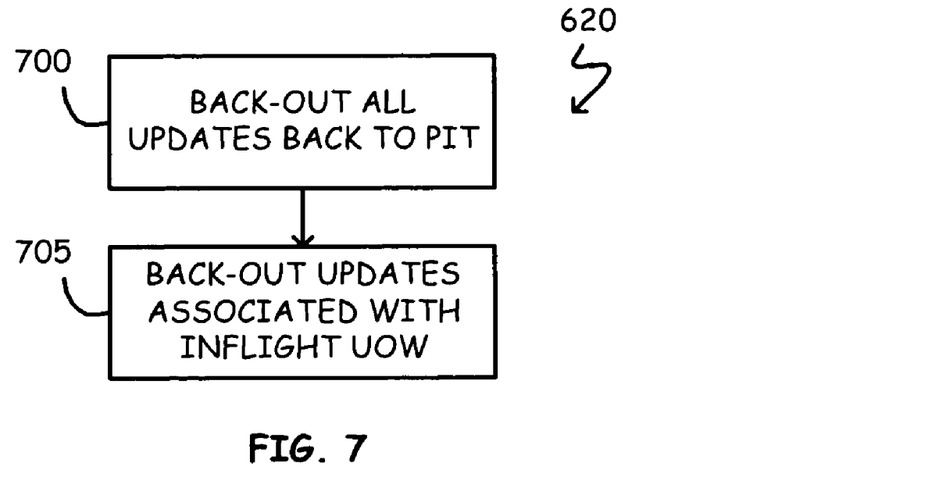
FIG. 7 shows, in flowchart form, a method to back-out certain updates previously made to a database copy in accordance with the invention.

With respect to the acts of block 620, FIG. 7 shows one technique for selectively backing out prior made updates to the image copy (created in accordance with the acts of block 610). First, all updates made subsequent to the specified point-in-time (PIT) are removed from the image copy—this includes updates that required structural changes to the target database objects (block 700). Next, all updates associated with UOW that were inflight at the designated point-in-time are also removed from the image copy—except for structural changes (block 705). See discussion above regarding block 210 of FIG. 2. In one embodiment, changes identified during the acts of block 615 (and removed in accordance with the acts of block 620) may be sorted by the page of memory in which the change is to be made so that only those pages of memory that need to be updated are accessed and then, only once. Further, because log entries are applied directly against the image copy, there is no interference with the source data set (i.e., the database from which the target objects have been copied).

With respect to the acts of block 625, and as specified by the output-option flag identified in Table 1, recover utility 600 in accordance with this embodiment of the invention may be used to recover a database (or portions thereof) that is consistent as of a designated and arbitrary time or to create a copy of a database (or portions thereof) that is consistent at a designated arbitrary time. If the recovery option is selected (e.g., copy-flag equals false), recover utility 600 blocks all access to the recovered objects while it substitutes the recovered objects for the original objects. In one embodiment, this action is done on a page-by-page basis. If the copy option is selected (e.g., copy-flag equals true), recover utility 600 provides a consistent copy of the designated database objects in a manner as described above with respect to block 120 (see FIG. 1).

As described herein, techniques in accordance with the invention are directed to creating physically and transactionally consistent copies of a database (or portions thereof). In some embodiments, the consistent copy is created as of the time a copy utility is executed (see FIGS. 1 and 2 and their associated text description). In another embodiment, a consistent copy is created as of an arbitrary specified time, wherein a prior copy is modified to bring it "up-to-date." The resulting copy may be used to replace one or more database objects (i.e., during a recover operation), or it may be output as a separate copy (see FIGS. 4 and 5 and their associated text description). In yet another embodiment, a consistent copy is created by starting with a current snapshot of the target database (or portions thereof) and selectively removing updates back to the user-specified point-in-time. This embodiment may also be used to recover a database (or portions thereof) or to generate an independent copy of the database objects (see FIGS. 6 and 7 and their associated text description). Each of the described methods generate consistent copies of a target database (or portions thereof) without causing a user-access outage. That is, without blocking users from access to the database objects during the copy operation. While access is blocked during the recover operation, this blockage may occur only after the substitute (consistent) copy is generated and only for those objects actually being restored. It is further noted that techniques in accordance with the invention permit a user to specify an arbitrary point-in-time at which the generated copy is to be consistent. Thus, the invention is not limited to creating consistent copies to those fortuitously generated during the normal course of business operations (e.g., daily or weekly backups).

Various changes in the details of the illustrated operational methods are possible without departing from the scope of the following claims. For example, the described recover utilities 400 and 600 may be invoked using strategies or syntax different from that outlined in Table 1. In addition, acts in accordance with FIGS. 1, 2 and 4–7 may be embodied in computer executable instructions, organized into one or more programs or routines. Storage devices suitable for tangibly embodying program instructions include, but not limited to: magnetic disks (fixed, floppy, and removable) and tape; optical media such as CD-ROM disks; and semiconductor memory devices such as Electrically Programmable Read-Only Memory (EPROM), Electrically Erasable Programmable Read-Only Memory (EEPROM), Programmable Gate Arrays and flash devices. Computer instructions may be executed by a programmable control device. A programmable control device may be a single computer processor, a plurality of computer processors coupled by a communications link, or a custom designed state machine.

What is claimed is:

1. An unobtrusive database object copy method, comprising:
   identifying one or more source database objects;
   creating a snapshot of the one or more source database objects at a point-in-time in a manner that does not substantially block access to the source database objects;
   identifying changes to the source database objects as of the point-in-time that do not exist in the snapshot;
   updating the snapshot to reflect the identified changes;
   identifying inflight units of work associated with the source database objects as of the point-in-time, wherein each inflight unit of work is associated with one or more database object updates; and
   removing each of the one or more database object updates associated with each identified inflight unit of work from the snapshot.

2. The method of claim 1, wherein the act of identifying one or more source database objects comprises identifying one or more tables in a relational database.

3. The method of claim 2, further comprising identifying one or more indexes associated with the one or more tables.

4. The method of claim 1, wherein the act of creating comprises generating a snapshot using one or more intelligent storage devices.

5. The method of claim 1, wherein the act of removing does not include removing database object updates that effect structural changes in the database objects.

6. The method of claim 1, wherein the act of identifying changes further comprises:
   identifying a page in memory in the snapshot that each identified change is associated with; and
   sorting the identified pages.

7. The method of claim 6, wherein the act of updating comprises updating pages in the snapshot in their sorted order.

8. The method of claim 1, wherein the act of identifying inflight units of work further comprises:
   identifying a page in memory in the snapshot that each identified inflight unit of work is associated with; and
   sorting the identified pages.

9. The method of claim 8, wherein the act of removing comprises removing each of the one or more database object updates from the snapshot in their sorted order.

10. The method of claim 9, wherein the act of removing does not include removing database object updates that effect structural changes in the database objects.

11. An unobtrusive database object copy method, comprising:
    identifying one or more source database objects in a database;
    determining a point-in-time;
    obtaining a prior copy of the identified one or more source database objects, said prior copy having a creation time before the point-in-time;
    identifying inflight units of work associated with the source database objects as of the point-in-time, wherein each inflight unit of work is associated with one or more database object updates, said identified inflight units of work including a unit of work having an earliest start time, the earliest start time being closer to the creation time of the prior consistent copy than a start time associated with any other identified inflight unit of work;
    applying database log entries to the prior copy from the creation time until the earliest start time; and
    applying database log entries to the prior copy from the earliest start time until the point-in-time only if they are not associated with inflight units of work.

12. The method of claim 11, wherein the act of identifying one or more source database objects comprises identifying one or more tables in a relational database.

13. The method of claim 12, further comprising identifying one or more indexes associated with the one or more tables.

14. The method of claim 11, wherein the act of determining comprises determining a point-in-time that is prior to initiation of the unobtrusive database object copy method.

15. The method of claim 11, wherein the act of obtaining comprises obtaining a prior copy against which database log entries may be applied.

16. The method of claim 11, wherein the act of identifying inflight units of work further comprises:
identifying a page in memory in the prior copy associated with each database object update between the creating time and the point-in-time;
identifying a page in memory in the prior copy associated with each database object update associated with each identified inflight unit of work; and
sorting the identified pages.

17. The method of claim 16, wherein the act of applying database log entries to the prior copy from the creation time until the earliest start time comprises applying said database log entries in their sorted page order.

18. The method of claim 16, wherein the act of applying database log entries to the prior copy from the earliest start time until the point-in-time comprises applying said database log entries in their sorted page order.

19. The method of claim 11, further comprising substituting the point-in-time consistent copy for the source database objects in the database.

20. The method of claim 11, further comprising:
blocking access to the source database objects in a source database;
replacing the source database objects in the source database with the point-in-time consistent copy of the database objects; and
permitting access to the point-in-time consistent copy of the database objects in the database.

21. An unobtrusive database object copy method, comprising:
identifying one or more source database objects in a database;
determining a point-in-time;
creating a snapshot of the one or more source database objects at a time after the point-in-time and in a manner that does not substantially block access to the source database objects in the database;
identifying changes to the source database objects as of the point-in-time that do not exist in the snapshot;
updating the snapshot to reflect the identified changes;
removing all updates from the snapshot made after the point-in-time;
identifying inflight units of work associated with the source database objects as of the point-in-time, wherein each inflight unit of work is associated with one or more database object updates; and
removing each of the one or more database object updates associated with each identified inflight unit of work from the snapshot.

22. The method of claim 21, wherein the act of identifying one or more source database objects comprises identifying one or more tables in a relational database.

23. The method of claim 22, further comprising identifying one or more indexes associated with the one or more tables.

24. The method of claim 21, wherein the act of determining comprises determining a point-in-time that is prior to initiation of the unobtrusive database object copy method.

25. The method of claim 21, wherein the act of removing each of the one or more database object updates associated with each identified inflight unit of work does not include removing database object updates that effect structural changes in the database objects.

26. The method of claim 21, wherein the act of identifying changes further comprises:
identifying a page in memory in the snapshot that each identified change is associated with; and
sorting the identified pages.

27. The method of claim 26, wherein the act of updating comprises updating pages in the snapshot in their sorted order.

28. The method of claim 21, wherein the act of removing all updates further comprises:
identifying a page in memory in the snapshot that each change to be removed is associated with; and
sorting the identified pages.

29. The method of claim 28, wherein the act of removing all updates further comprises removing all updates from the snapshot made after the point-in-time in their sorted order.

30. The method of claim 21, wherein the act of identifying inflight units of work further comprises:
identifying a page in memory in the snapshot that each identified inflight unit of work is associated with; and
sorting the identified pages.

31. The method of claim 30, wherein the act of removing each of the one or more database object updates associated with each identified inflight unit of work comprises removing each of the one or more database object updates associated with each identified inflight unit of work from the snapshot in their sorted order.

32. The method of claim 21, wherein the act of removing each of the one or more database object updates associated with each identified inflight unit of work does not include removing database object updates that effect structural changes in the source database objects in the snapshot.

33. The method of claim 21, further comprising substituting the point-in-time consistent copy for the source database objects in the database.

34. The method of claim 21, further comprising:
blocking access to the source database objects in the source database;
replacing the source database objects in the source database with the point-in-time consistent copy of the database objects; and
permitting access to the point-in-time consistent copy of the database objects in the database.

35. A program storage device, readable by a programmable control device, comprising instructions stored therein for causing the programmable control device to:
identify one or more source database objects;
create a snapshot of the one or more source database objects at a point-in-time in a manner that does not substantially block access to the source database objects;
identify changes to the source database objects as of the point-in-time that do not exist in the snapshot;
update the snapshot to reflect the identified changes;
identify inflight units of work associated with the source database objects as of the point-in-time, wherein each inflight unit of work is associated with one or more database object updates; and
remove each of the one or more database object updates associated with each identified inflight unit of work from the snapshot.

36. The program storage device of claim 35, wherein the instructions to remove do not include instructions to remove database object updates that effect structural changes in the database objects.

37. A program storage device, readable by a programmable control device, comprising instructions stored therein for causing the programmable control device to:

identify one or more source database objects in a database;

determine a point-in-time;

obtain a prior copy of the identified one or more source database objects, said prior copy having a creation time before the point-in-time;

identify inflight units of work associated with the source database objects as of the point-in-time, wherein each inflight unit of work is associated with one or more database object updates, said identified inflight units of work including a unit of work having an earliest start time, the earliest start time being closer to the creation time of the prior consistent copy than a start time associated with any other identified inflight unit of work;

apply database log entries to the prior copy from the creation time until the earliest start time; and apply database log entries to the prior copy from the earliest start time until the point-in-time only if they are not associated with inflight units of work to generate a consistent point-in-time copy.

38. The program storage device of claim 37, further comprising instructions to substitute the point-in-time consistent copy for the source database objects in the database.

* * * * *